Y

(12) United States Patent
Enomoto et al.

(10) Patent No.: US 8,831,689 B2
(45) Date of Patent: Sep. 9, 2014

(54) ELECTRONIC DEVICE

(75) Inventors: Shigeru Enomoto, Kanagawa (JP); Haijie Hewu, Tokyo (JP); Yasutaka Miwa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 65 days.

(21) Appl. No.: 13/609,767

(22) Filed: Sep. 11, 2012

(65) Prior Publication Data

US 2013/0117591 A1    May 9, 2013

(30) Foreign Application Priority Data

Nov. 7, 2011    (JP) .................................. 2011-243731

(51) Int. Cl.
   *H04B 1/38*    (2006.01)
   *G06F 1/32*    (2006.01)
(52) U.S. Cl.
   CPC ............ *G06F 1/3231* (2013.01); *G06F 1/3287* (2013.01)
   USPC .......................... 455/574; 455/550.1; 455/566
(58) Field of Classification Search
   CPC ............. G06F 1/32; G11C 5/14; G09G 65/00
   USPC ........ 455/563, 550.1, 572–574, 343.1–343.6, 455/560, 566; 713/320
   See application file for complete search history.

(56) References Cited

U.S. PATENT DOCUMENTS

| 6,121,962 | A | 9/2000 | Hwang |
| 6,915,143 | B2 * | 7/2005 | Kashu et al. .................. 455/560 |
| 7,558,820 | B2 | 7/2009 | Kimoto et al. |
| 7,596,389 | B2 * | 9/2009 | Tsuda et al. .................. 455/566 |
| 2003/0173829 | A1 * | 9/2003 | Zeng ............................. 307/116 |
| 2006/0205445 | A1 * | 9/2006 | Sakaniwa et al. ............. 455/574 |
| 2008/0076485 | A1 * | 3/2008 | Lee et al. ...................... 455/574 |
| 2009/0312059 | A1 * | 12/2009 | Pratt et al. ..................... 455/566 |
| 2012/0028625 | A1 * | 2/2012 | Konig ........................... 455/418 |

FOREIGN PATENT DOCUMENTS

| JP | 11015548 A | 1/1999 |
| JP | 2011053930 A | 3/2011 |

OTHER PUBLICATIONS

Office Action for corresponding JP Patent Application No. 2011-243731, dated Sep. 3, 2013.

* cited by examiner

*Primary Examiner* — Sharad Rampuria
(74) *Attorney, Agent, or Firm* — Matthew B. Dernier. Esq.; Gibson & Dernier LLP

(57) ABSTRACT

Manipulation receiving unit receives an operation input by a user manipulation. In case the manipulation receiving unit does not receive an input operation for a predetermined time period, a state control unit sets an operation state to a power saving state. However, if the voice receiving unit receives voice input before a non-operation time period reaches the predetermined time period, the status control unit does not set the operation state to the power saving state even if the manipulation receiving unit does not receive an input operation during the predetermined time period. The non-operation time period is defined as a time period during which the manipulation receiving unit does not receive an input operation.

7 Claims, 8 Drawing Sheets

10

10

ELECTRONIC DEVICE

BACKGROUND OF THE INVENTION

1. Field of the Invention

The present invention relates to an electronic device provided with a power saving function.

2. Description of the Related Art

Electronic devices such as portable game devices, Personal Data Assistants (PDAs), or the like have become popular. Recent years, a number of electronic devices are equipped with a communication function. Further, multifunctional electronic devices such as smart phones, which combine functions of mobile phones, PDAs, or the like in one device, have come on the market. On such an electronic device, high capacity memory and a high speed processor are installed. By installing a participatory application program on the electronic device, a user can enjoy the application with other users.

[PATENT DOCUMENT No. 1] U.S. Pat. No. 7,558,820

Since mobile electronic devices are driven by a battery, it is preferable that the devices be capable of reducing unnecessary power consumption as much as possible. For this purpose, such an electronic device is typically equipped with a power saving function, and is configured so as to switch to a power saving state autonomously if the electronic device is not manipulated by a user for a predetermined time period. However, when the device enters a suspend state, the execution of an application is interrupted. Thus, it is not preferable for some applications that the device enter the suspend state even if the device is not manipulated for a while.

SUMMARY OF THE INVENTION

In this background, a purpose of the present invention is to provide a technology for controlling a power saving function.

In order to address the aforementioned issue, an electronic device is provided according to an aspect of the present invention. The electronic device includes: a manipulation receiving unit operative to receive an operation input through user manipulation; a state control unit operative to set an operation state to a power saving state if the manipulation receiving unit does not receive an input operation during a first predetermined time period; and a voice receiving unit operative to receive voice input. Herein, the voice input may include not only user's voice, but also sound or audio input. If the voice receiving unit receives voice input before a non-operation time period reaches the first predetermined time period, the status control unit does not set the operation state to the power saving state even if the manipulation receiving unit does not receive an input operation during the first predetermined time period. The non-operation time period is defined as a time period during which the manipulation receiving unit does not receive an input operation.

According to another aspect of the present invention, also an electronic device is provided. On the electronic device are installed: a power control application operative to execute a state control function that switches an operation state between a normal state and a power saving state, which consumes less power than the normal state; and a voice chat application operative to receive voice input and execute a voice chat function. The power control application measures non-operation time period during which no operation input by a user is received, and if the non-operation time period reaches a predetermined time period, switches the operation state from the normal state to the power saving state. If the voice chat application receives voice input, the power control application resets the measured non-operation time.

Optional combinations of the aforementioned constituting elements, and implementations of the invention in the form of methods, apparatuses, systems, recording mediums, computer programs, or the like may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
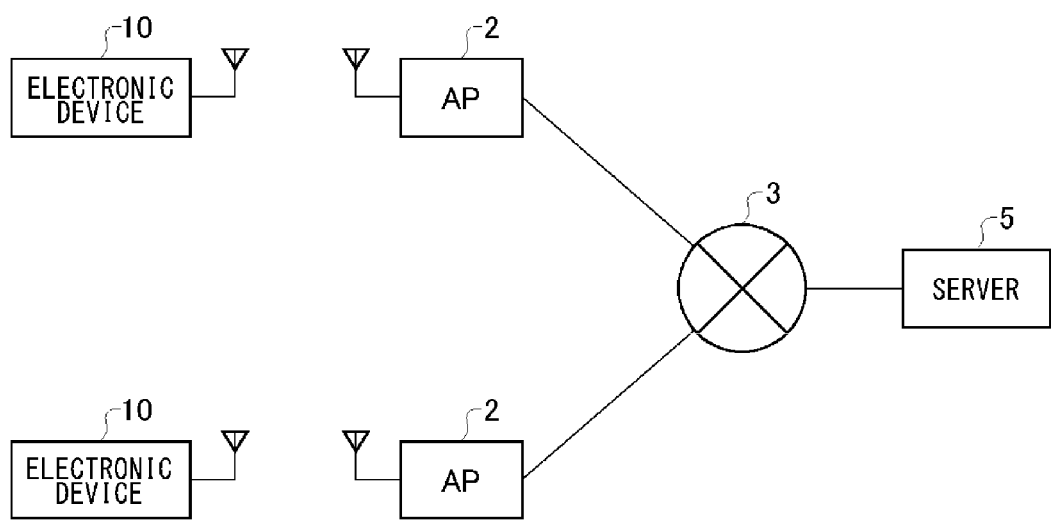
FIG. 1 shows an example of the configuration of an information processing system according to an exemplary embodiment.

FIG. 1 shows an example of the configuration of an information processing system 1 according to an exemplary embodiment. In the information processing system 1, an access point (AP) 2 provides the functionality of a wireless access point and a router, and each electronic device 10 is connected to a network 3, such as the Internet or the like, via the AP 2, a modem (not shown), or the like.

The electronic device 10 is provided with a wireless communication function. The electronic device 10 is connected to a server 5 on the network 3 via the AP 2, and transmits its data to the server 5 and receives data of another electronic device 10 from the server 5. Although the electronic device 10 may be provided with a communication function based on a wireless Local Area Network (LAN) system and may communicate with the server 5 in infrastructure mode, the electronic device 10 may also communicate with the server 5 on the basis of a communication system adopted by mobile phones or the like, such as the third generation mobile communication system or the like. In this case, the electronic device 10 communicates with the server 5 via a base station having a wide communication area. Therefore, a user can use the electronic device 10 even in the open air. In the information processing system 1, a user has a user account for identifying the user himself/herself and signs in a network service provided by the server 5 by using the user account.

The electronic device 10 according to the exemplary embodiment is an information terminal device driven by a battery, and is provided with a function of switching an operation state between a normal (awake) state and a power saving state that consumes less power than the normal state. This power control function is implemented by a power control application embedded in system software. The power control application measures a non-operation time period during which no operation is input by a user. If the non-operation time period reaches a predetermined time period, the power control application switches the operation state from the normal state to the power saving state. According to the exemplary embodiment, the power saving state is provided in a stepwise manner. The first step is a low-light state where the brightness value of a display is reduced, and the second step is a suspend state.

According to the exemplary embodiment, a plurality of users constitute one group and make voice chat in the group. During voice chat, a user speaks to a microphone of the electronic device 10 and listens to voice of another user output from a speaker. Thus the users are not required to manipulate manipulation means provided on the electronic device 10. Consequently, if the power control application sets the operation state of the electronic device 10 to the suspend state when the non-operation time period reaches the predetermined time period, the voice chat is interrupted forcibly, which is inconvenient. Therefore in the exemplary embodiment, a technology will be presented where a power control application controls state transition in case that a voice chat application receives voice input.

An explanation will be given on the external structure and the circuit configuration of the electronic device 10 according to the exemplary embodiment. Although the electronic device 10 illustrated in the following is a portable game device, the electronic device 10 may be another type of hand-held terminal device.

[Structure of the Front Face]

Figure 2A:
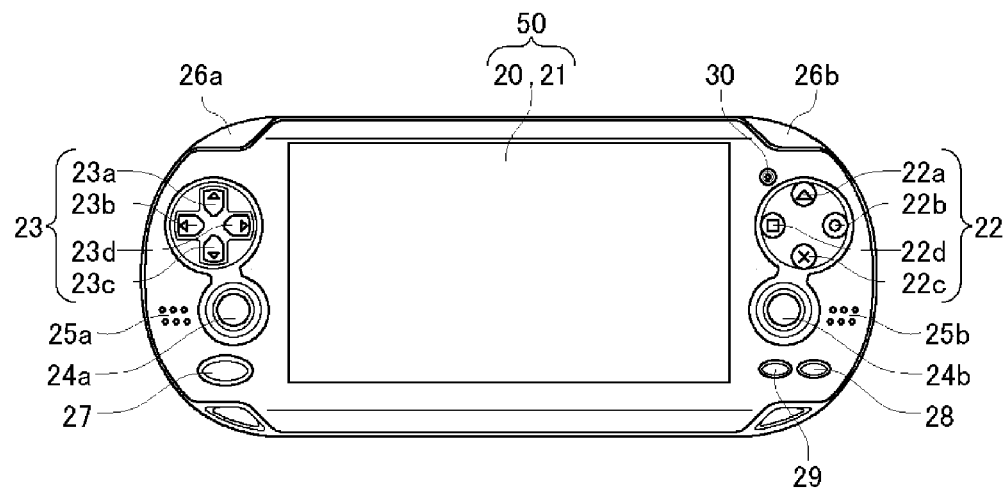
FIG. 2A shows the front of an electronic device and FIG. 2B shows the rear of the electronic device.

FIG. 2A shows the front of the electronic device 10. The electronic device 10 is formed into a horizontally long housing. The right and left sides of the housing, which are held by a user, have an arc-shaped outer surface. On the front surface of the electronic device 10 is provided a rectangular touch panel 50. The touch panel 50 comprises a display device 20 and a front touch pad 21 that is transparent and covers the surface of the display device 20. The display device 20 is an organic Electro-Luminescence (EL) panel, and displays an image. Alternatively, the display device 20 may be a display means such as a liquid crystal panel or the like. The front touch pad 21 is a multi-touch pad having a function of detecting a plurality of points touched concurrently. The touch panel 50 is configured as a multi-touch screen.

At the right of the touch panel 50 are provided a triangle button 22a, a circle button 22b, a cross button 22c, and a square button 22d (hereinafter referred to as "control buttons 22" when referred collectively). The buttons are located at the vertices of a rhombus, respectively. At the left of the touch panel 50 are provided an up key 23a, a left key 23b, a down key 23c, and a right key 23d (hereinafter referred to as "directional keys 23" when referred collectively). A user can input eight directions (up, down, left, and right directions, and diagonal directions) by manipulating the directional keys 23. Below the directional keys 23, a left stick 24a is provided, and below the control buttons 22, a right stick 24b is provided. A user tilts the left stick 24a or the right stick 24b (herein after referred to as "analogue sticks 24" when referred collectively) so as to input the direction and the degree of the tilt. On the upper left and upper right of the housing an L button 26a and an R button 26b are provided, respectively. The control buttons 22, the directional keys 23, the analogue sticks 24, the L button 26a, and the R button 26b implement manipulation means for user manipulation.

In the vicinity of the control buttons 22, a front camera 30 is provided. At the left of the left stick 24a and at the right of the right stick 24b, a left speaker 25a and a right speaker 25b (herein after referred to as "speakers 25" when referred collectively) that output sound are provided respectively. Further, below the left stick 24a is provided a HOME button 27 and below the right stick 24b are provided a START button 28 and a SELECT button 29.

[Structure of the Rear Face]

Figure 2B:
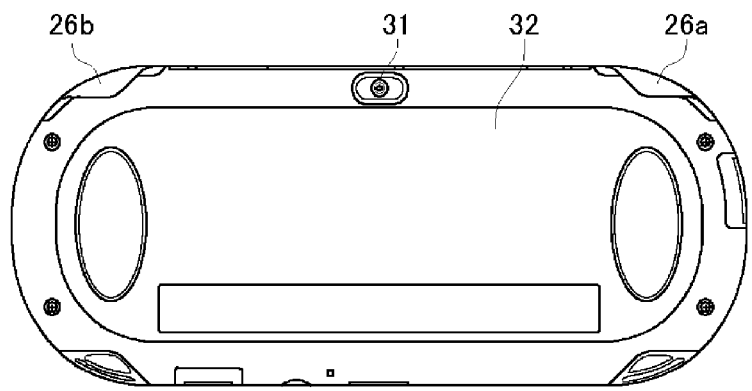

FIG. 2B shows the rear of the electronic device 10. On the rear surface of the electronic device 10, a rear camera 31 and a rear touch pad 32 are provided. In a similar manner as that of the front touch pad 21, the rear touch pad 32 is configured as a multi-touch pad. Two cameras and two touch pads are mounted on the electronic device 10 at the front and rear surfaces.

[Structure of the Top Surface]

Figure 3A:
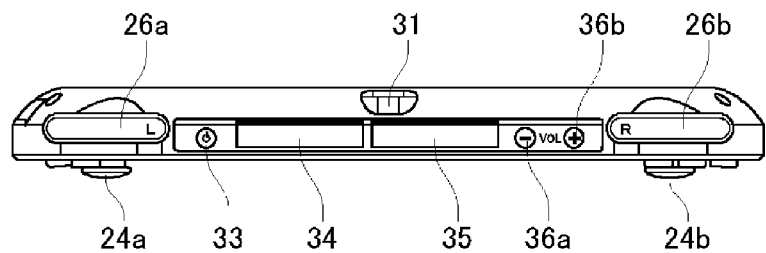
FIG. 3A shows the top view of the electronic device.

FIG. 3A shows the top view of the electronic device 10. As described previously, at the left and right edges of the top surface of the electronic device 10 are provided the L button 26a and the R button 26b, respectively. At the right of the L button 26a, a power button 33 is provided. A user turns the power on or off by pressing the power button 33. The electronic device 10 is provided with a power control function that makes a transition to a suspend state if a time period during which no operation is input (non-operation time period) lasts for a predetermined time period. If the electronic device 10 enters the suspend state, a user can return the electronic device 10 from the suspend state to an awake state by pressing the power button 33.

A game card slot 34 is a slot for inserting a game card. FIG. 3A shows the game card slot 34 that is covered by a slot cover. In the vicinity of the game card slot 34, an LED lamp may be provided that blinks when a game card is accessed. An accessory terminal 35 is a terminal for connecting a peripheral device (accessory). FIG. 3A shows the accessory terminal 35 that is covered by a terminal cover. Between the accessory terminal 35 and the R button 26b are provided a minus button 36a and a plus button 36b for adjusting volume.

[Structure of the Bottom Surface]

Figure 3B:
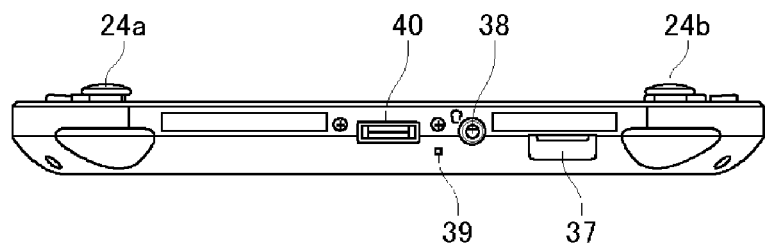
FIG. 3B shows the bottom view of the electronic device.

FIG. 3B shows the bottom view of the electronic device 10. A memory card slot 37 is a slot for inserting a memory card. FIG. 3B shows the memory card slot 37 that is covered by a slot cover. On the bottom surface of the electronic device 10 are provided an audio input and output terminal 38, a microphone 39, and a multi-use terminal 40. The multi-use terminal 40 supports Universal Serial Bus (USB), and can be connected to another device via a USB cable.

[Structure of the Left Side]

Figure 3C:
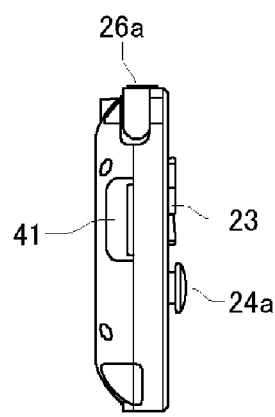
FIG. 3C shows the left side view of the electronic device.

FIG. 3C shows the left side view of the electronic device 10. On the left side face of the electronic device 10 is provided a SIM card slot 41, which is a slot for inserting a SIM card.

[Circuit Configuration of the Electronic Device]

Figure 4:
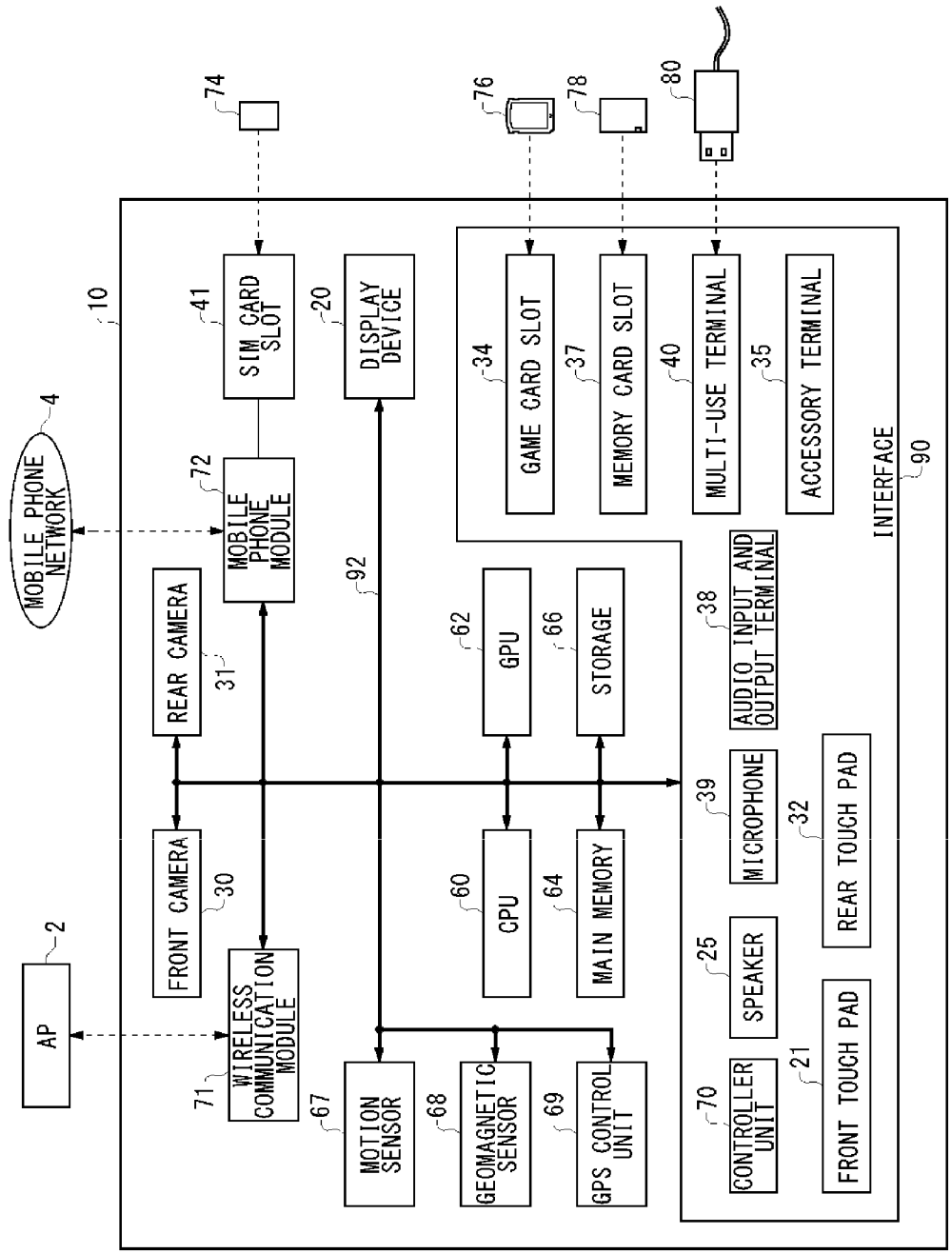
FIG. 4 shows the circuit configuration of the electronic device.

FIG. 4 shows the circuit configuration of the electronic device 10. Respective elements thereof are connected to one another via a bus 92. A wireless communication module 71 comprises a wireless LAN module that complies with a communication standard such as IEEE802.11b/g or the like. The wireless communication module 71 is connected to an external network via an AP2. The wireless communication module 71 may be provided with a Bluetooth (registered trademark) protocol communication function. A mobile phone module 72 supports the 3rd Generation digital mobile phone system that complies with the International Mobile Telecommunication Standard 2000 (IMT-2000) defined by the International Telecommunication Union (ITU). The mobile phone module 72 is connected to a mobile phone network 4. Inserted in the SIM card slot 41 is a SIM card 74, on which unique ID numbers for identifying the telephone number of a mobile phone is stored. As a result of the SIM card 74 being inserted in the SIM card slot 41, the mobile phone module 72 can communicate with the mobile phone network 4.

A Central Processing Unit (CPU) 60 executes a program or the like loaded onto a main memory 64. A Graphics Processing Unit (GPU) 62 performs calculations required for image processing. The main memory 64 is configured with Random Access Memory (RAM) or the like, and stores a program and/or data to be used by the CPU 60. A storage 66 is configured with a NAND-type flash memory or the like, and is utilized as a built-in auxiliary storage device.

A motion sensor 67 detects the movement of the electronic device 10, and a geomagnetic sensor 68 detects earth-geomagnetism in each of the three-axis directions. A GPS control unit 69 receives signals from the GPS satellites and calculates the current position. The front camera 30 and the rear camera 31 capture an image and input the image data thereof. The front camera 30 and the rear camera 31 are configured with a Complementary Metal Oxide Semiconductor (CMOS) image sensor.

The display device 20 is an organic EL display device, and provided with a light emitting element which emits light when a voltage is applied between a negative electrode and a positive electrode. During power saving mode, by reducing the voltage to be applied between the electrodes to a level below that of a normal mode, the display device 20 can be turned into a low-light state. Thus, the power consumption can be restricted. Alternatively, the display device 20 may be a liquid crystal display device provided with a backlight. During power saving mode, by reducing the light intensity of the backlight, the liquid crystal display device can be turned into a low-light state. Thus, the power consumption can be restricted.

In an interface 90, a controller unit 70 includes various manipulation means provided in the electronic device 10. More specifically, the controller unit 70 includes the control buttons 22, the directional keys 23, the analogue sticks 24, the L button 26a, the R button 26b, the HOME button 27, the START button 28, the SELECT button 29, the power button 33, the minus button 36a, and the plus button 36b. The front touch pad 21 and the rear touch pad 32 are a multi-touch pad. The front touch pad 21 is arranged so as to be overlaid on the surface of the display device 20. The speaker 25 outputs sound generated by respective functions of the electronic device 10. The microphone 39 inputs sound from around the electronic device 10. The audio input and output terminal 38 inputs stereo sound from an external microphone and outputs stereo sound to an external headphone or the like.

In the game card slot 34, a game card 76 that stores a game file is inserted. The game card 76 is provided with a storage area where data can be written. If the game card 76 is placed in the game card slot 34, data is written/read by a media drive. In the memory card slot 37, a memory card 78 is inserted. When the memory card 78 is placed into the memory card slot 37, the memory card 78 is utilized as an external auxiliary storage device. The multi-use terminal 40 can be utilized as a USB terminal. The multi-use terminal 40 is connected to a USB cable 80 and transmits data to and receives data from another USB device. To the accessory terminal 35, a peripheral device is connected.

In the information processing system 1, each of the electronic devices 10 signs in a network service provided by the server 5 by using a user account. The electronic devices 10 can execute an application where a plurality of users can participate (a multi-player-on-line application). In the exemplary embodiment, each of the electronic devices 10 executes a voice chat application. A procedure will be indicated below on the assumption that a user A has an electronic device 10a and a user B has an electronic device 10b, and the users A and B make voice chat together.

If the electronic device 10a of the user A generates an instruction for creating a session of the voice chat application, and transmits the instruction to the server 5, the server 5 creates a session in accordance with the instruction for creating a session. The server 5 issues identification information for identifying a session (herein after referred to as a "session ID") and sends the session ID to the electronic device 10a. The session ID may be a Universal Resource Identifier (URI) for connecting to the server 5. The URI is utilized in order to allow the other electronic device 10b that is to participate in the session to communicate synchronously via the server 5. If a session ID is given to the electronic device 10a by the server 5, the electronic device 10a generates presence information including the acquired session ID and transmits the presence information to the server 5. The presence information includes status information that indicates the execution status of the application. This status information includes information indicating whether or not participation in a session of the application is allowed.

The server 5 controls the presence information transmitted from the electronic device 10. The electronic device 10b of the user B acquires the presence information of the user A by periodically accessing the server 5. In case that the status information included in the presence information of the user A includes information on an allowance of participation, the electronic device 10b generates a GUI indicating that the user A is executing an application, which the user B can participate in. If the user B declares participation, the electronic device 10b transmits to the server 5 an instruction for participation in the session. Upon receiving the instruction for participation in a session, the server 5 registers the user B with the session, which allows the user A and the user B to make voice chat by using the session ID.

Figure 5:
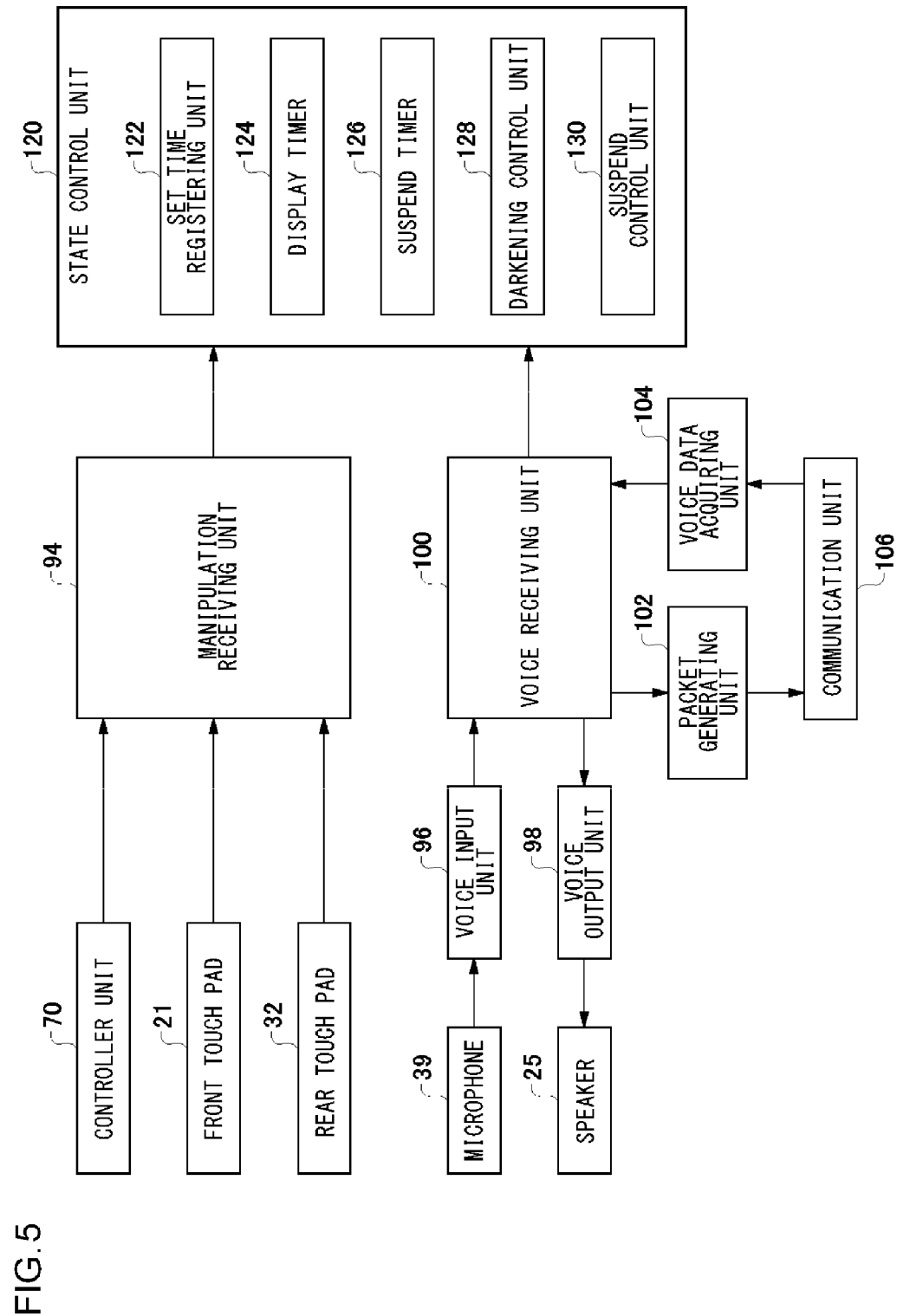
FIG. 5 shows functional blocks of an electronic device that controls power according to the exemplary embodiment.

FIG. 5 shows functional blocks of an electronic device 10 that controls power according to the exemplary embodiment. The electronic device 10 comprises, a manipulation receiving unit 94, a voice input unit 96, a voice output unit 98, a voice receiving unit 100, a packet generating unit 102, a voice data acquiring unit 104, a communication unit 106, and a state control unit 120. Those elements are implemented by a CPU of a computer, memory, a program loaded into the memory, or the like in terms of hardware components. FIG. 5 depicts functional blocks implemented by cooperation of these components. Therefore, it will be obvious to those skilled in the art that the functional blocks may be implemented in a variety of ways, by hardware only, software only, or a combination thereof.

The manipulation receiving unit 94 receives an operation input by a user via the controller unit 70, the front touch pad 21, and/or the rear touch pad 32. In case the manipulation receiving unit 94 does not receive an input operation for a predetermined time period, the state control unit 120 sets the operation state of the electronic device 10 to the power saving state. The state control unit 120 is provided with a set time registering unit 122, a display timer 124, a suspend timer 126, a dimming control unit 128, and a suspend control unit 130. The functions of the state control unit 120 are implemented by the power control application of system software installed on the electronic device 10. The state control unit 120 measures time during which no operation input by a user is acknowledged (non-operation time period). If the non-operation time period reaches a predetermined time period, the state control unit 120 switches the operation state from a normal (awake) state to a power saving state.

According to the exemplary embodiment, as a power saving state are provided in a stepwise manner a low-light state where the display device 20 is dimmed and a suspend state where the system of the electronic device 10 is suspended. In the low-light state, the display device 20 is dimmed, which allows the power consumption of the display device 20 to be reduced. In the suspend state, although the power is supplied to a RAM that stores the status of work immediately before the power is turned off, the power supply to other components is stopped. Since the power supply to the CPU 60 is also stopped, high power saving effect is implemented during the suspend state. The light of the display device 20 is completely extinguished in the suspend state. Therefore, setting a power saving state one step before the suspend state to the low-light state allows a user to recognize that power saving control is performed in a stepwise manner.

The set time registering unit 122 registers a time period for switching to a power saving state. More specifically, the set time registering unit 122 retains a time period (T1) for switching to the suspend state. The time period T1 may be defined by a user. For example, a user selects one of a plurality of options (1 minute, 3 minutes, 5 minutes, or 10 minutes) and registers the time period T1 for switching to a suspend state. A time period for switching to the low-light state (T2) can be calculated by multiplying the time period T1 by a predetermined coefficient α (α<1). Therefore, the set time registering unit 122 is merely required to register the time period T1 as far as the display timer 124 can derive the time period T2 by the computational expression time period T1 multiplied by a. Alternatively, the set time registering unit 122 may retain the time period T2. In this case, time period T1>time period T2.

First, an explanation will be given on basic operation of the state control unit 120.

Upon receiving an input operation, the manipulation receiving unit 94 notifies the state control unit 120 that an input operation is acknowledged. In response to the notification, the state control unit 120 starts measuring time from the last input operation to the next input operation, that is, a time period during which no operation is input (non-operation time period). Upon detecting that the non-operation time period reaches the time period T2, the display timer 124 notifies the dimming control unit 128 thereof, and the dimming control unit 128 dims the light of the display device 20. Subsequently, upon detecting that the non-operation time period reaches the time period T1, the suspend timer 126 notifies the suspend control unit 130 thereof, and the suspend control unit 130 suspends the electronic device 10. If being notified by the manipulation receiving unit 94 of an input operation before the non-operation time period reaches the time period T2, the display timer 124 resets a counter and restarts the measurement of the non-operation time period. In a similar manner, if being notified by the manipulation receiving unit 94 of an input operation before the non-operation time period reaches the time period T1, the suspend timer 126 resets a counter and restarts the measurement of the non-operation time period. After the non-operation time period exceeds the time period T2 and the display device 20 is set to a low-light state and before the non-operation time period reaches the time period T1, if the manipulation receiving unit 94 receives an input operation, the dimming control unit 128 returns the operation state of the display device 20 from the low-light state to a normal mode and the display timer 124 and the suspend timer 126 restart the measurement of the non-operation time period. Given above is the basic operation of the state control unit 120.

Next, an explanation will be given on an operation of the voice chat application.

The voice input unit 96 acknowledges voice input via the microphone 39. The voice input unit 96 has a voice detection function and converts voice at a certain volume or more into voice data. The voice receiving unit 100 receives the converted voice data as voice input. Then the packet generating unit 102 generates one or more voice packets, and the communication unit 106 transmits the one or more voice packets to the server 5. The communication unit 106 is a wireless communication module 71 or a mobile phone module 72. Thereby, voice can be transmitted one or more other users who participate in the voice chat.

The communication unit 106 receives the one or more voice packets transmitted from other electronic devices 10, and the voice data acquiring unit 104 acquires voice data included in the one or more voice packets. The voice receiving unit 100 receives the acquired voice data as voice input and the voice output unit 98 outputs voice from the speaker 25. This allows a user to hear voice from another user.

An explanation will be given below on power control during voice chat.

If the voice receiving unit 100 receives voice input, the voice receiving unit 100 notifies the state control unit 120 that voice input is acknowledged. The suspend timer 126 is measuring non-operation time period, and upon receiving notification indicating that voice input is acknowledged (herein after referred to as a "voice input notification") before the non-operation time period reaches the time period T1, the suspend timer 126 resets the count of the timer. That is, during voice chat, the suspend timer 126 presumes voice input as an input operation and the suspend timer 126 restarts the measurement of the non-operation time period from a count value "0." In this manner, if the voice receiving unit 100 receives voice input from the voice input unit 96 or receives voice input from the voice data acquiring unit 104 before the non-operation time period reaches the time period T1, the suspend control unit 130 does not sets the operation state to the suspend state even if the manipulation receiving unit 94 does not receive an input operation during the time period T1. Thereby, even if no operation is input during voice chat, the state control unit 120 can avoid, by handling voice input as an input operation, a situation where the voice chat application is interrupted.

Meanwhile, the measurement of the non-operation time period by the display timer 124 is not reset by the voice input notification. Therefore, even if the display timer 124 receives the voice input notification before the non-operation time period reaches the time period T2, the display timer 124 does not reset the count of the timer and the measurement of the non-operation time period is continued. Therefore, if the non-operation time period reaches the time period T2, the dimming control unit 128 sets the operation state to the low-light state. This is because watching information displayed on a display is not so much required of a user during voice chat, thus low lighting will not be a trouble. Further, power consumption can be reduced by dimming the display. If the manipulation receiving unit 94 receives an input operation before the operation state is set to the suspend state, the dimming control unit 128 turns back the operation state of the display device 20 from the low-light state to the normal state.

Figure 6:
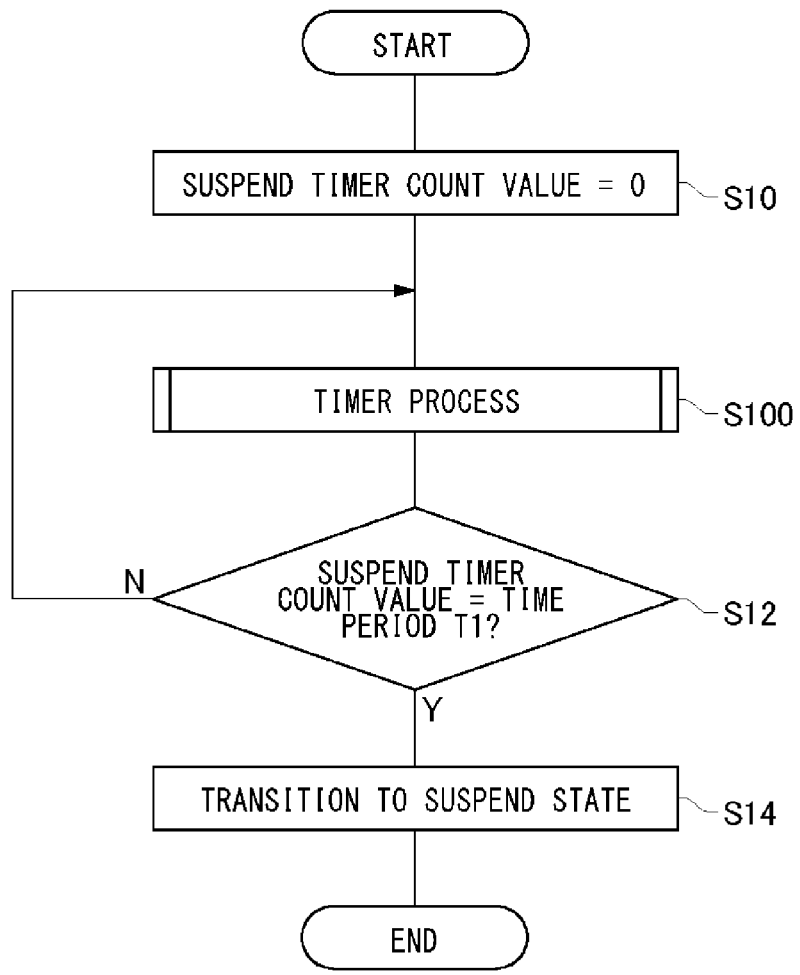
FIG. 6 shows a flowchart indicating a process of transition to a suspend state.

FIG. 6 shows a flowchart indicating a process of transition to the suspend state. First, the suspend timer count value is set to "0" (S10). Timer process is started (S100). If the suspend timer count value does not reach the time period T1 (N in S12), the timer process is continued. If the suspend timer count value reaches the time period T1 (Y in S12), the suspend control unit 130 sets the operation state to the suspend state (S14). The timer process of step S100 will be described later with reference to FIG. 8.

Figure 7:
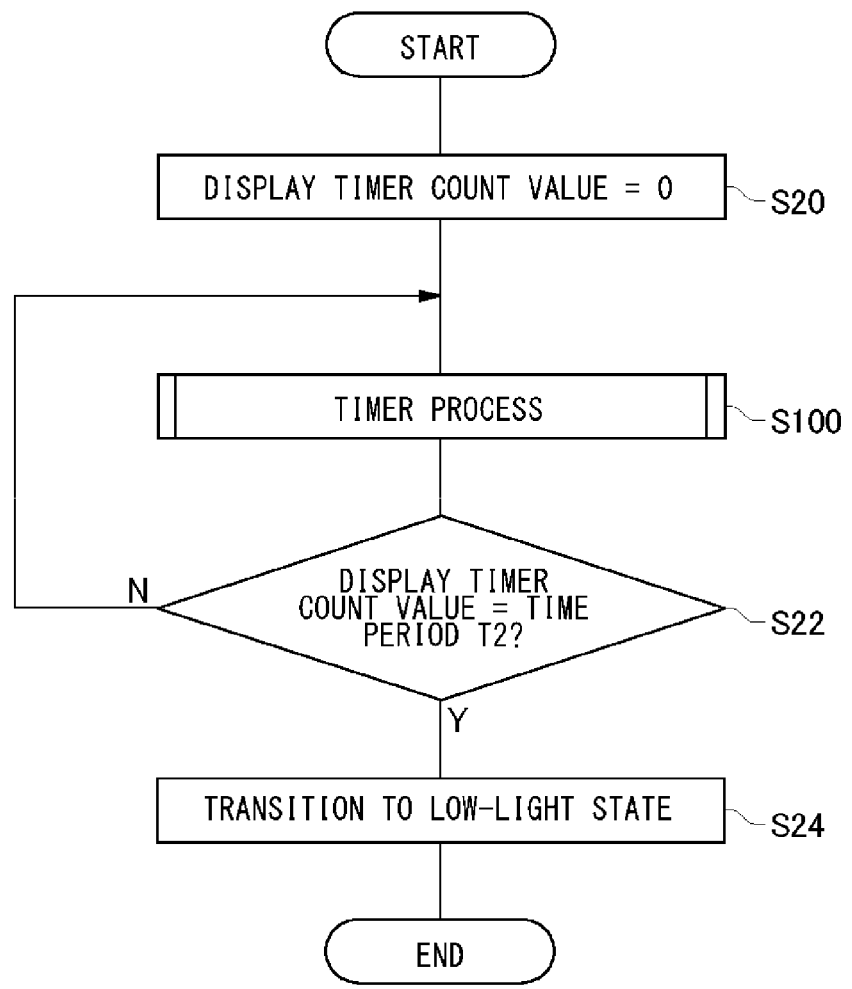
FIG. 7 shows a flowchart indicating a process of transition to a low-light state.

FIG. 7 shows a flowchart indicating a process of transition to the low-light state. First, a display timer count value is set to "0" (S20). The timer process is started (S100), if the display timer count value does not reach the time period T2 (N in S22), the timer process is continued. If the display timer count value reaches the time period T2 (Y in S22), the dimming control unit 128 sets the operation state to the low-light state (S24). The timer process of step S100 will be described later with reference to FIG. 8.

Figure 8:
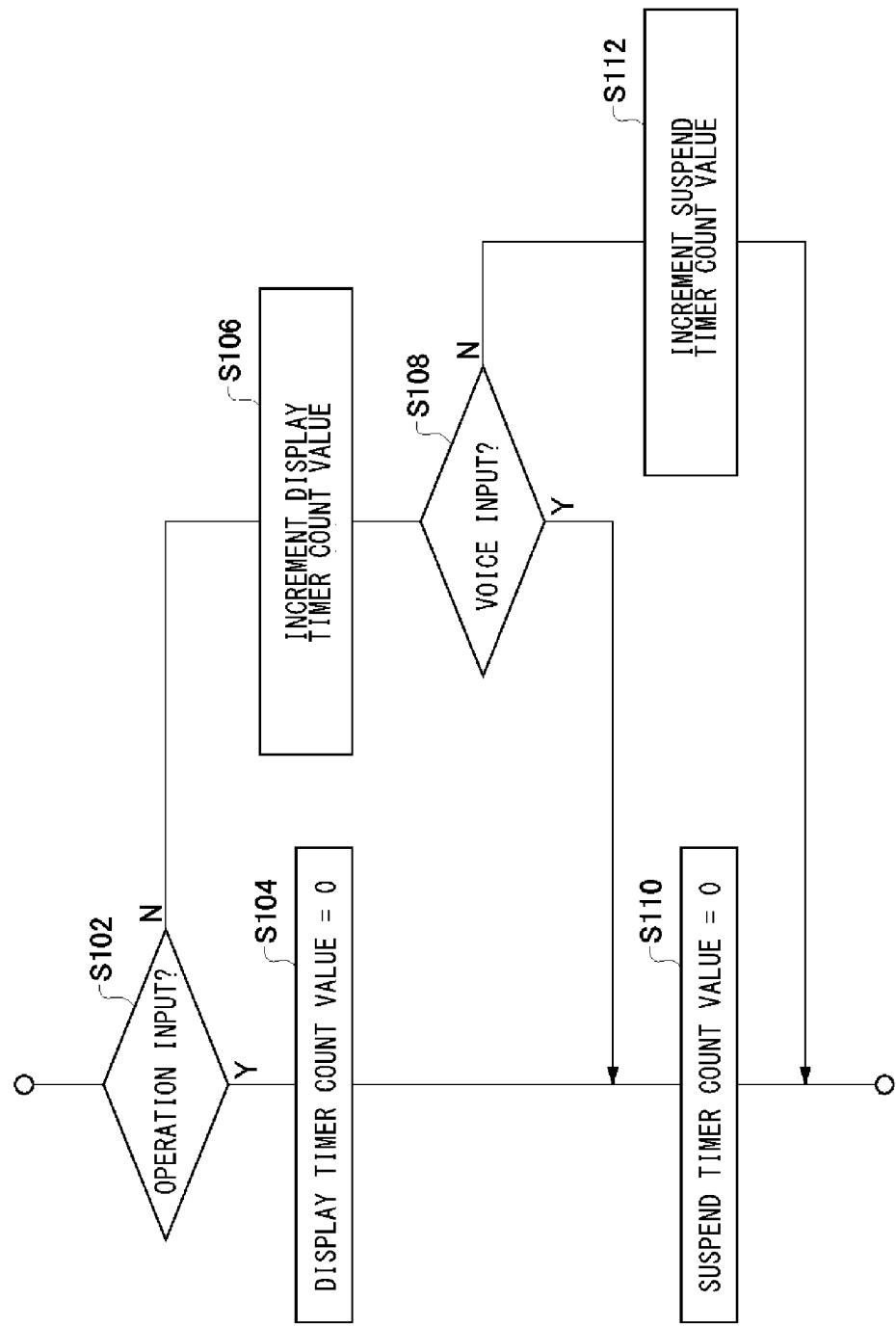
FIG. 8 shows a flowchart indicating a timer process of step S100 shown in FIG. 6 and FIG. 7.

FIG. 8 shows a flowchart indicating a timer process of step S100 shown in FIG. 6 and FIG. 7. If the manipulation receiving unit 94 receives an input operation (Y in S102), the display timer 124 sets the display timer count value to "0" (S104), and the suspend timer 126 sets the suspend timer count value to "0" (S110), and the measurement of the non-operation time period is restarted from the count values 0, respectively.

If the manipulation receiving unit 94 does not receive an input operation (N in S102), the display timer 124 increments the display timer count value by one (S106). Meanwhile, if the voice receiving unit 100 receives voice input (Y in S108), the suspend timer 126 sets the suspend timer count value to "0" (S110). If the voice receiving unit 100 does not receive voice input (N in S108), the suspend timer 126 increments the suspend timer count value by one (S112). In the manner described above, the timer process is performed.

In the flowchart shown in FIG. 7, if the manipulation receiving unit 94 receives input operation after switching to the low-light state at step S24 and before the operation state is set to the suspend state, the dimming control unit 128 switches back the operation state of the display device 20 from the low-light state to the normal state. Since the operation input by a user is an indication of intention to turn the electronic device 10 back to the normal state, in this case, the brightness of the display device 20 is turned to a normal brightness, and enables the reception of operation input from a user. Meanwhile, even if the voice receiving unit 100 receives voice input after switching to the low-light state at step S24 and before the operation state is set to the suspend state, the dimming control unit 128 does not changes the operation state from the low-light state. This enables the implementation of reduction of power consumption by the low-light state while continuing voice chat.

Given above is an explanation based on the exemplary embodiment. This embodiment is intended to be illustrative only and it will be obvious to those skilled in the art that various modifications to constituting elements and processes could be developed and that such modifications are also within the scope of the present invention. Although an example is presented wherein a plurality of electronic devices 10 are connected by a wireless LAN system in infrastructure mode according to the exemplary embodiment, the electronic devices 10 may be connected in ad-hoc mode.

Further, according to the exemplary embodiment if the suspend timer 126 receives the voice input notification before the non-operation time period reaches the time period T1, the count of the timer is reset. In this process, the suspend timer 126 may set the count value of the timer to the time period T2. Particularly, if the non-operation time period exceeds the time period T2, the suspend timer 126 may set the count value of the timer to the time period T2 and may restart the measurement of the non-operation time period from a count value corresponding to the time period T2.

What is claimed is:

1. An electronic device comprising:
 a manipulation receiving unit operative to receive an input operation through user manipulation;
 a voice receiving unit operative to receive voice input;
 a state control unit operative to: (i) set an operation state to a suspend state if the manipulation receiving unit does not receive an input operation by a first predetermined time period, (ii) not set the operation state to the suspend state, even if the manipulation receiving unit does not receive an input operation by the first predetermined time period, if the voice receiving unit receives voice input by the first predetermined time period, and (iii) set the operation state to a low-light state if the manipulation receiving unit does not receive an input operation by a second predetermined time period, which is shorter than the first predetermined time period, even if the voice receiving unit receives voice input by the second predetermined time period.

2. The electronic device according to claim 1 further comprising:
 an acquiring unit operative to acquire voice data transmitted from another electronic device; and
 a voice input unit operative to convert input voice to voice data,
 wherein the voice receiving unit acknowledges the acquired voice data or the converted voice data as voice input.

3. The electronic device according to claim 1, wherein a voice chat application provides functionality of the voice receiving unit.

4. The electronic device according to claim 1, wherein:
 the state control unit is implemented via a power control application operative to execute a state control function that switches the operation state between a normal state and a power saving state, which consumes less power than the normal state, wherein the power saving state includes the suspend state and the low-light state; and
 the voice receiving unit is implemented via a voice chat application operative to receive the voice input and execute a voice chat function.

5. A non-transitory computer-readable recording medium containing a computer program, comprising:
 a manipulation receiving module configured to receive an input operation by a user manipulation;
 a voice receiving module configured to receive voice input;
 a state control module configured to: (i) set an operation state to a suspend state if the manipulation receiving module does not receive an input operation by a predetermined time period, (ii) not set the operation state to the suspend state, even if the manipulation receiving module does not receive an input operation by the predetermined time period, if the voice receiving module receives voice input by the first predetermined time period, and (iii) set the operation state to a low-light state if the manipulation receiving module does not receive an input operation by a second predetermined time period, which is shorter than the first predetermined time period, even if the voice receiving module receives voice input by the second predetermined time period.

6. An electronic device comprising:
 a manipulation receiving unit operative to receive an input operation through user manipulation;
 a voice receiving unit operative to receive voice input; and
 a state control unit operative to: (i) set an operation state to a suspend state if the manipulation receiving unit does not receive an input operation by a first predetermined time period, (ii) not set the operation state to the suspend state, even if the manipulation receiving unit does not receive an input operation by the first predetermined time period, if the voice receiving unit receives voice input by the first predetermined time period, and (iii) set the operation state to a low-light state if the manipulation receiving unit does not receive an input operation by a second predetermined time period, which is shorter than the first predetermined time period.

7. The electronic device according to claim 6, wherein the state control unit is provided with a timer that measures the first and second time periods, and the state control unit resets a count of the timer if the voice receiving unit receives voice input.

* * * * *